(12) United States Patent
Rice et al.

(10) Patent No.: US 11,329,596 B2
(45) Date of Patent: May 10, 2022

(54) CONTROL CIRCUIT FOR A MULTI-PHASE MOTOR

(71) Applicant: ZF AUTOMOTIVE UK LIMITED, Solihull West Midlands (GB)

(72) Inventors: Nathanael Rice, Edwalton (GB); Tamas Terdy, Birmingham (GB); Charles Mahendhrarajah, Gien (FR); Maciej Kudanowski, Solihull West Midlands (GB)

(73) Assignee: ZF AUTOMOTIVE UK LTD., West Midlands (GB)

( * ) Notice: Subject to any disclaimer, the term of this patent is extended or adjusted under 35 U.S.C. 154(b) by 22 days.

(21) Appl. No.: 16/765,179

(22) PCT Filed: Nov. 26, 2018

(86) PCT No.: PCT/GB2018/053409
§ 371 (c)(1),
(2) Date: May 19, 2020

(87) PCT Pub. No.: WO2019/106348
PCT Pub. Date: Jun. 6, 2019

(65) Prior Publication Data
US 2020/0287499 A1     Sep. 10, 2020

(30) Foreign Application Priority Data
Nov. 28, 2017 (GB) ..................... 1719771

(51) Int. Cl.
*H02P 5/51* (2016.01)
*H02P 29/024* (2016.01)
(Continued)

(52) U.S. Cl.
CPC .......... *H02P 29/0241* (2016.02); *B62D 5/046* (2013.01); *H02K 11/33* (2016.01);
(Continued)

(58) Field of Classification Search
CPC ...... H02P 29/0241; H02P 23/14; H02P 27/06; H02P 29/028; H02K 11/33; B62D 5/046; H02M 7/53871
See application file for complete search history.

(56) References Cited

U.S. PATENT DOCUMENTS

| | | | |
|---|---|---|---|
| 8,058,824 B2 * | 11/2011 | Williams | H02P 6/182 318/265 |
| 2014/0191699 A1 * | 7/2014 | Dixon | H02P 21/05 318/503 |

(Continued)

FOREIGN PATENT DOCUMENTS

| JP | 2009220766 | 10/2009 |
|---|---|---|
| JP | 201472316 | 4/2014 |
| WO | 2016038362 | 3/2016 |

*Primary Examiner* — Muhammad S Islam
(74) *Attorney, Agent, or Firm* — Tarolli, Sundheim, Covell & Tummino LLP

(57) ABSTRACT

A control circuit for a multi-phase motor (57) comprises a plurality of inverter bridges, a plurality of outputs, and at least one isolation switch (62, 63). Each inverter bridge is arranged to provide an output voltage for a phase of the motor (57). Each output is arranged to be coupled to one phase of the motor (57) to provide the output voltage to that phase of the motor (57). Each isolation switch (62, 63) is coupled between one of the inverter bridges and one of the outputs, so as to selectively isolate the output from the inverter bridge. Each isolation switch (62, 63) comprises a Gallium Nitride (GaN) transistor.

11 Claims, 3 Drawing Sheets

(51) Int. Cl.
*H02K 11/33* (2016.01)
*B62D 5/04* (2006.01)
*H02M 7/5387* (2007.01)
*H02P 23/14* (2006.01)
*H02P 27/06* (2006.01)
*H02P 29/028* (2016.01)

(52) U.S. Cl.
CPC ........ *H02M 7/53871* (2013.01); *H02P 23/14* (2013.01); *H02P 27/06* (2013.01); *H02P 29/028* (2013.01)

(56) References Cited

U.S. PATENT DOCUMENTS

| | | |
|---|---|---|
| 2015/0288304 A1 | 10/2015 | Chappell et al. |
| 2016/0013741 A1* | 1/2016 | Prahlad .................. B62D 5/046 318/503 |
| 2016/0028335 A1* | 1/2016 | Dixon ........................ H02P 6/10 318/432 |
| 2016/0114830 A1* | 4/2016 | Dixon .................... B62D 5/046 701/41 |
| 2017/0141714 A1 | 5/2017 | Looby et al. |
| 2017/0170770 A1 | 6/2017 | Tsukano et al. |
| 2017/0214354 A1 | 7/2017 | Yamakawa et al. |
| 2017/0305456 A1* | 10/2017 | Iwabuki ............... H05K 5/0043 |
| 2018/0138838 A1* | 5/2018 | Rice .......................... H02P 5/51 |

* cited by examiner

CONTROL CIRCUIT FOR A MULTI-PHASE MOTOR

RELATED APPLICATION

This application corresponds to PCT/GB2018/053409, filed Nov. 26, 2018, which corresponds to British Application No. 1719771.6, filed Nov. 28, 2017, the subject matter of which are incorporated herein by reference in their entirety.

This invention relates to a control circuit for a multi-phase motor, a motor apparatus using such a control circuit, an electric power steering apparatus using such a motor apparatus, a vehicle using such a steering apparatus and an associated method.

Power MOSFETs (metal oxide semiconductor field effect transistors) are commonly used for the implementation of inverter bridges for driving permanent magnet synchronous motors (PMSMs) and for phase isolation functions in automotive applications and otherwise.

The shortcoming of designs using MOSFET for phase isolation is due to the intrinsic body diode present in a MOSFET. This allows for the conduction of current at a low forward voltage drop ($V_{SD}$, the forward voltage drop of the body diode when carrying rated current, typically being less than 1V) in one direction when the MOSFET is off. This can allow damping currents which can result from voltages generated by a turning motor and under bridge MOSFET short circuit fault conditions. These damping currents are undesirable and, for example in an electric power assisted steering (EPAS) system, can lead to a reduction in steering assistance to a user.

Such unwanted currents, can only be fully controlled by using 3 or 4 MOSFET phase isolation devices as shown in FIGS. 1 and 2 of the accompanying drawings respectively. In each case three pairs 1 and 2, 3 and 4, and 5 and 6 of MOSFETs selectively connect a phase of a three-phase EPAS motor 7 to either a DC bus 8 or ground 9. For the sake of argument, MOSFET 1 in each case is shown as having suffered a short circuit failure.

Arrows 10 show a potential uncontrolled current flow in the case of such a short circuit failure, which it is possible to control using MOSFET phase isolation switches. In the example of FIG. 1, a MOSFET phase isolation switch 11, 12, 13 in each phase is required to be able to stop the unwanted currents, bearing in mind each MOSFET can only stop current flowing in one direction.

In the example of FIG. 2, two MOSFETs in series 14, 15, 16, 17 are provided for each of two phases of the motor 7. This provides the same level of control as for FIG. 1.

Additionally if it is the intention to control current in the two phases not connected to the short circuited inverter MOSFET 2, it is necessary to block current in and out of each of the faulty inverter limbs individually. Such a solution would require a 6 phase isolation MOSFET (18, 19, 20, 21, 22, 23) implementation as shown in FIG. 3.

As phase isolation MOSFETs are power devices that are of significant cost as well as introducing additional inserted losses into the motor control circuit, it is desirable to limit the required number of devices to achieve the phase isolation function.

In accordance with a first aspect of the invention, there is provided a control circuit for a multi-phase motor, the control circuit comprising:

a plurality of inverter bridges, each inverter bridge being arranged to provide an output voltage for a phase of the motor;

a plurality of outputs, each output being arranged to be coupled to one phase of the motor to provide the output voltage to that phase of the motor; and at least one isolation switch, each isolation switch being coupled between one of the inverter bridges and one of the outputs, so as to selectively isolate the output from the inverter bridge;

in which the each isolation switch comprises a Gallium Nitride (GaN) transistor.

As such, we have appreciated that the Gallium Nitride (GaN) transistor can be used as an isolation switch, avoiding the problems that prior art Metal Oxide Semiconductor Field Effect Transistors (MOSFETs) involve given MOSFETs' inherent parasitic body diode. By using GaN transistors as the isolation transistors, the number of components can be reduced (because there is no longer a need to employ as many components because there is no need to compensate for the body diode), which reduces manufacturing cases, as well as reducing energy consumption and heat evolution.

The GaN transistor may provide the selective isolation of each isolation switch; that is, the GaN transistor may provide a switching function to selective apply the output voltage of the inverter bridge to which its isolation switch is coupled to the output.

Each inverter bridge which is not coupled to an isolation switch may be coupled to an output. Thus, some of the inverter bridges may be directly coupled to the outputs without an isolation switch.

The control circuit may be provided with a controller which is arranged to, in a normal mode of operation, close each isolation switch so that each isolation switch does not isolate its output from its inverter bridge and allows the output voltage from its inverter bridge to be applied to its output. As such, the controller may be arranged to apply a positive voltage between a gate terminal and a source terminal of each GaN transistor in the normal mode of operation.

The controller may also be arranged to, in a phase isolation mode of operation, cause at least one of the isolation switches to isolate the output to which it is coupled from the inverter bridge to which it is coupled. The controller may be arranged so as to apply between the gate terminal and the source terminal, in the phase isolation mode, of each of the isolation switches which are to be caused to isolate:

a zero voltage if the voltage across the GaN transistor is positive; and a negative voltage if the voltage across the GaN transistor is negative.

The negative voltage applied between the gate terminal and the source terminal of each GaN transistor may be dependent upon the voltage across the GaN transistor.

Typically, the motor will be a three phase motor, and as such, there may be three inverter bridges and three outputs. In such a case, there may be two or three isolation switches, dependent upon whether it is desired control the current in the phases which are not isolated. Three isolation switches— one per phase—are required for such control.

According to a second aspect of the invention, there is provided a motor apparatus comprising a motor having a plurality of phases, and the control circuit of the first aspect of the invention, in which each phase is coupled to one of the outputs of the control circuit.

The motor may be a permanent magnet synchronous motor.

According to a third aspect of the invention, there is provided an electric power steering apparatus, comprising a steering mechanism for a vehicle and the motor apparatus of the second aspect of the invention, in which the motor is coupled to the steering apparatus so as to drive the steering mechanism to change the steering of the vehicle. The steering apparatus may be an electric power assisted steering apparatus, which provides steering assistance to a driver, or may be an entirely electric power steering apparatus in which the motor solely drives the steering mechanism.

According to a fourth aspect of the invention, there is provided a vehicle having the electric power steering apparatus of the third aspect of the invention, in which the electric power steering apparatus is arranged to change the steering of the vehicle so as to change the direction in which the vehicle moves.

According to a fifth aspect of the invention, there is provided a method of controlling a control circuit for a multi-phase motor, the control circuit comprising:

- a plurality of inverter bridges, each inverter bridge being arranged to provide an output voltage for a phase of the motor;
- a plurality of outputs, each output being arranged to be coupled to one phase of the motor to provide the output voltage to that phase of the motor; and
- at least one isolation switch, each isolation switch being coupled between one of the inverter bridges and one of the outputs, so as to selectively isolate the output from the inverter bridge;
- in which the each isolation switch comprises a Gallium Nitride (GaN) transistor;
- the method comprising, in a normal mode of operation, closing each isolation switch by causing each GaN transistor to conduct, and in a phase isolation mode of operation, isolating at least one output from the inverter bridge to which it is coupled by opening at least one isolation switch by causing each GaN transistor to cease conducting.

The method may comprise applying a positive voltage between a gate terminal and a source terminal of each GaN transistor in the normal mode of operation.

The method may comprise, in the phase isolation mode, applying between the gate terminal and the source terminal of each of the isolation switches which are to be caused to isolate:

- a zero voltage if the voltage across the GaN transistor is positive; and
- a negative voltage if the voltage across the GaN transistor is negative.

The negative voltage applied between the gate terminal and the source terminal of each GaN transistor may be dependent upon the voltage across the GaN transistor.

There now follows, by way of example only, description of embodiments of the invention, described with reference to the accompanying drawings, in which.

Figure 1:
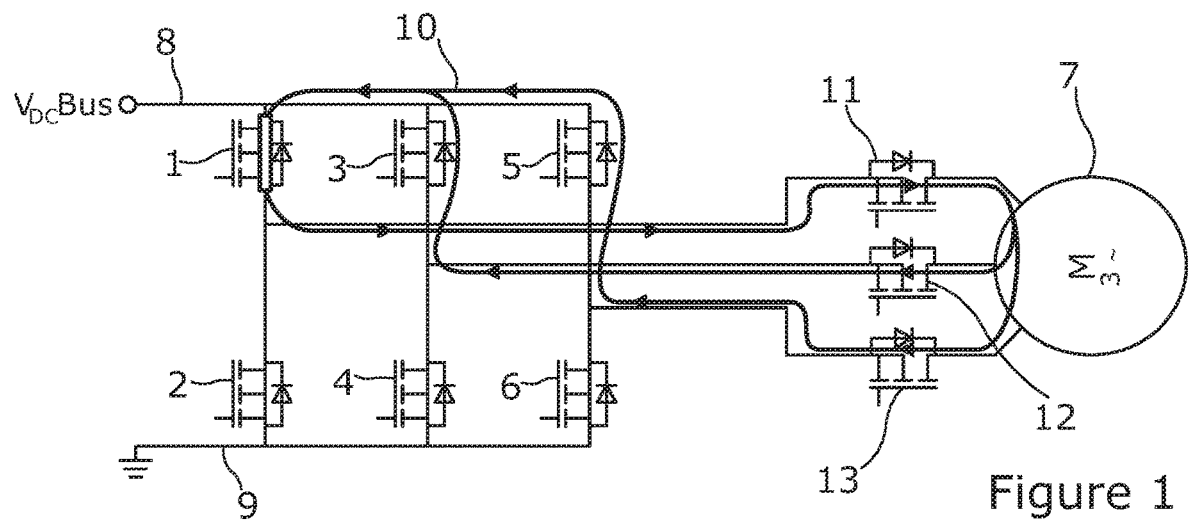
FIG. 1 shows a circuit diagram for a motor apparatus for an electric power assisted steering system in accordance with a first embodiment of the prior art.
Figure 2:
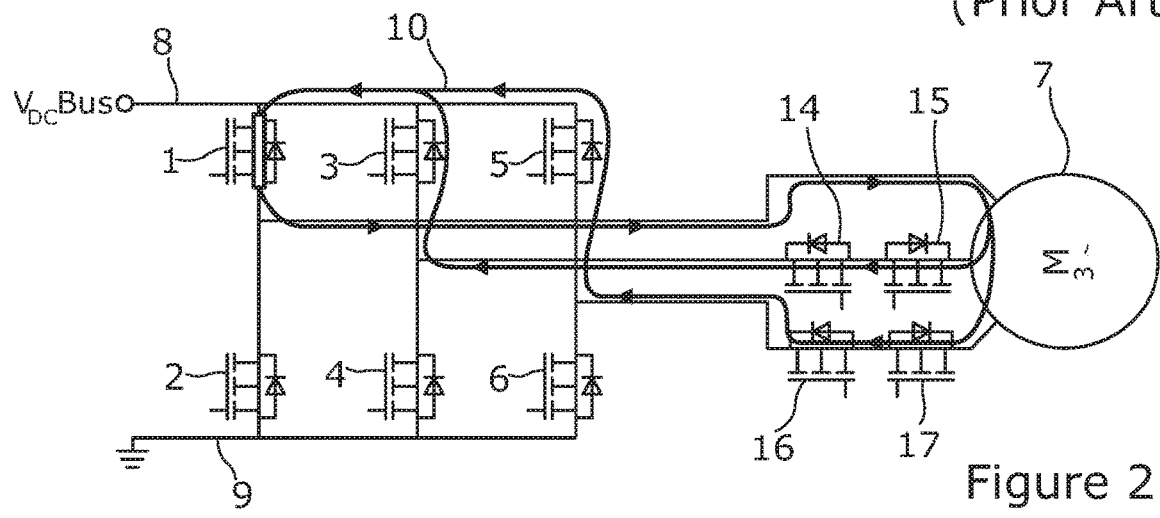
FIG. 2 shows a circuit diagram for a motor apparatus for an electric power assisted steering system in accordance with a second embodiment of the prior art.
Figure 3:
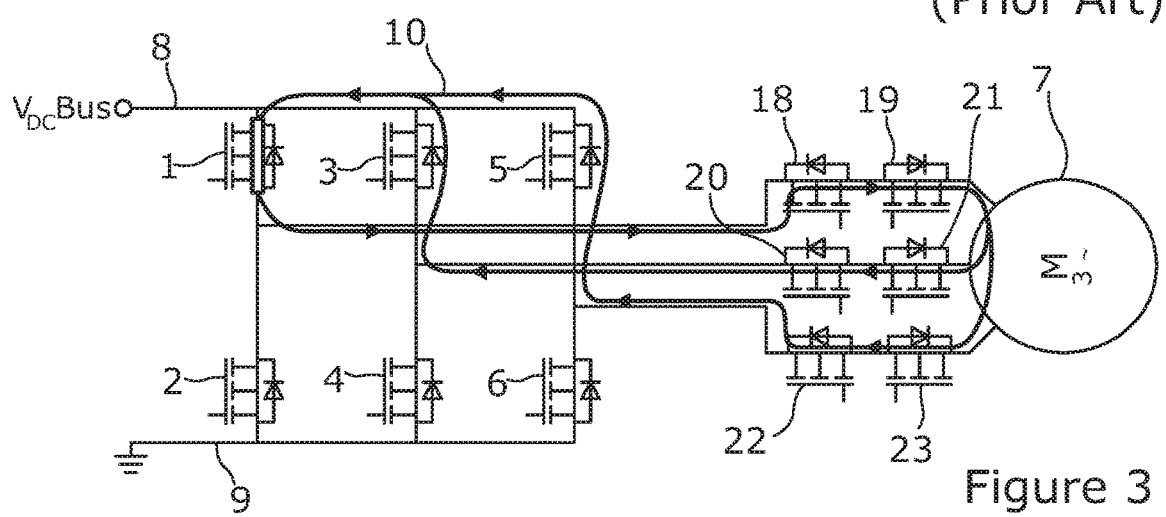
FIG. 3 shows a circuit diagram for a motor apparatus for an electric power assisted steering system in accordance with a third embodiment of the prior art.
Figure 4:
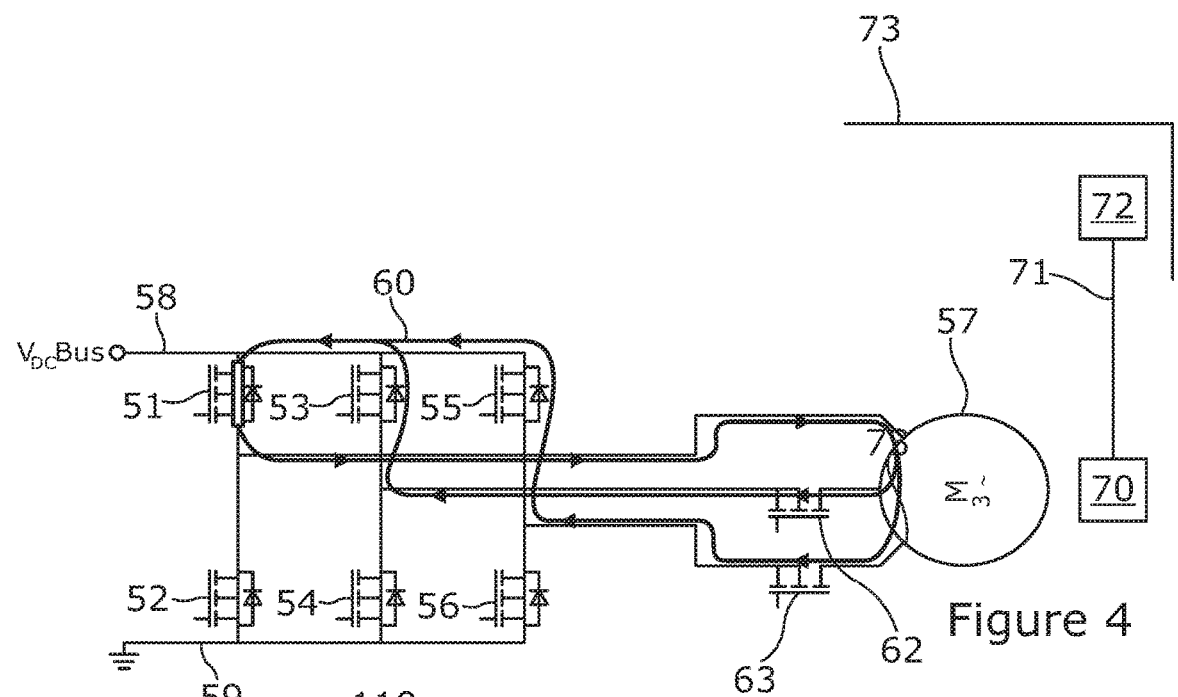
FIG. 4 shows a circuit diagram for a motor apparatus for an electric power assisted steering system in accordance with a first embodiment of the invention.

A motor apparatus for an electric power assisted steering (EPAS) system in accordance with a first embodiment of the invention is shown in FIG. 4 of the accompanying drawings. Equivalent features to those discussed with reference to FIGS. 1 to 3 above have been given corresponding reference numerals, raised by 50.

A permanent magnet synchronous motor 57 is coupled via a gearbox 70 to steering column 71 to provide steering assistance thereto. The steering column 71 is coupled to a steering mechanism 72 which changes the direction in which road wheels (not shown) of a vehicle 73 in which the apparatus is provided are pointing.

The motor 57 has three phases. In order to drive the motor 57 from a DC bus 58 (relative to ground 59), three inverter bridges are provided, each comprising a top switch 51, 53, 55 (selectively coupling a phase to the DC bus 58) and a bottom switch 52, 54, 56 (selectively coupling that phase to ground 59). These switches can be implemented as MOSFETs (metal oxide semiconductor field effect transistors).

In order to prevent unwanted currents 60 circulating in case of a top or bottom switch failing (e.g. switch 51 exhibiting a short-circuit failure), isolation switches 62, 63 are provided in two of the phases. Rather than using MOSFETs, these switches instead employ Gallium Nitride (GaN) transistors.

Figure 7:
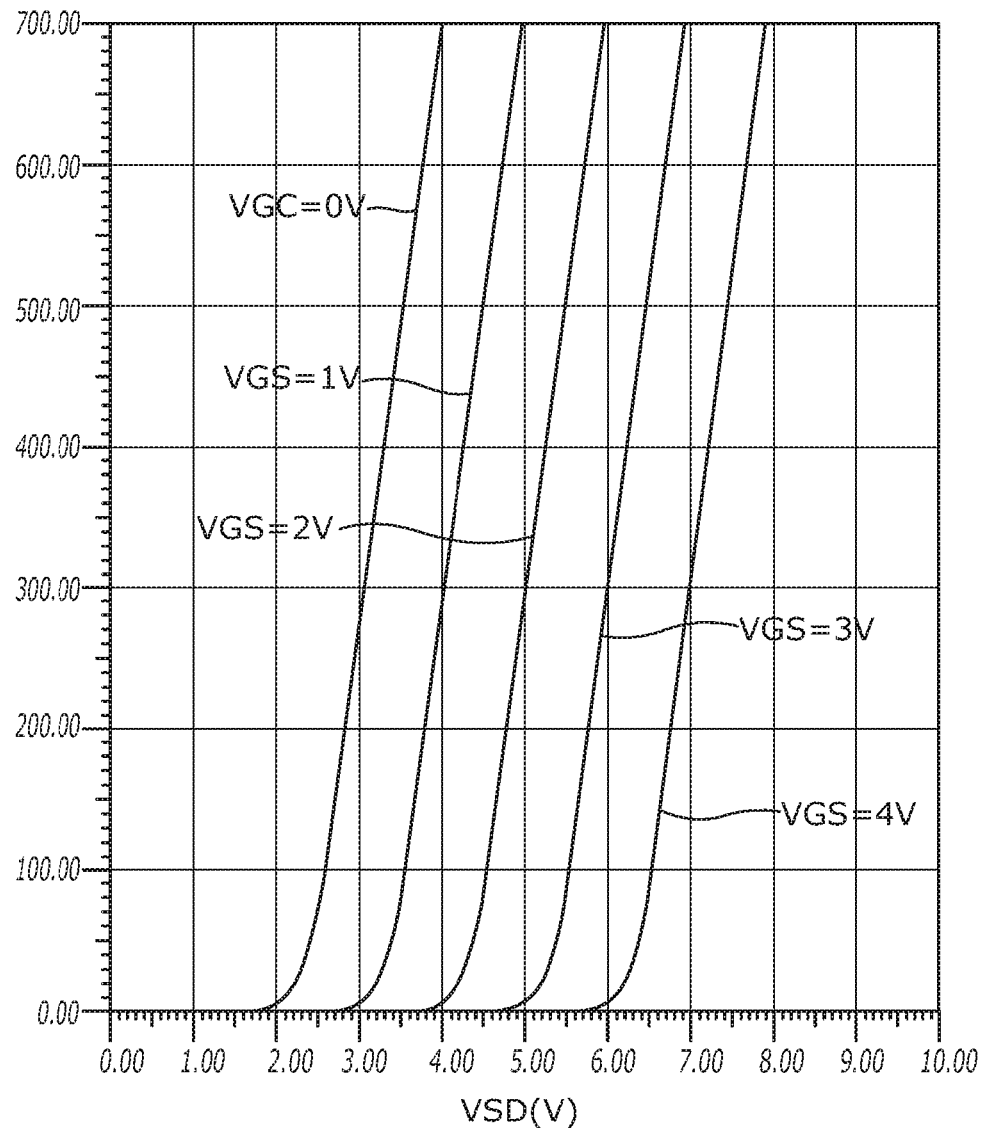
FIG. 7 shows a graph showing the reverse bias characteristic of a typical Gallium Nitride transistor used in the circuits of FIG. 4 or 5, plotted as a graph of current flowing vs voltage drop across the transistor.

GaN transistors are rapidly becoming a commercially viable alternative to MOSFETs. The GaN transistor structure is characterised by the absence of the parasitic bipolar junction and as a result has a different reverse bias operation mechanism. With zero bias gate to source, there is an absence of electrons under the gate region. As the drain voltage is decreased, a positive bias on the gate is created relative to the drift region, injecting electrons under the gate. Once the gate threshold is reached, there are sufficient electrons under the gate to form a conductive channel. As it takes threshold voltage to turn on the GaN transistor in the reverse direction, the forward voltage of the "diode" is higher than a silicon transistor. Significantly, by applying a negative $V_{GS}$ bias to the GaN device (as shown in FIG. 7 of the accompanying drawings) this "diode" forward voltage can be further increased to several volts.

Due to the lack of the parasitic MOSFET body diode behaviour, using GaN transistors for phase isolation reduces the number of semiconductor switches required for the complete solid state phase isolation relay (SSPIR) implementation from 4 to 2 in this embodiment, where it is merely desired to limit the unwanted current 10 in case of a switch failure. As such, the circuit of this embodiment is equivalent in function to that of FIG. 1 or 2 of the accompanying drawings.

In normal operation each GaN transistor 62, 63 is turned on by a positive voltage Vgs between the gate and source terminals in a similar manner to a MOSFET.

Under fault conditions such as a short circuit inverter MOSFET 51, the phase isolation GaN switches 62, 63 can be turned off to prevent uncontrolled currents circulating in the motor phases. This can be carried out by controlling the gate-source voltage of each GaN switch 62, 63 depending on the voltage across the switching element.

For a positive voltage across the GaN switch 62, 63, the gate-source voltage may be maintained close to 0V. For a negative voltage across the GaN switch 62, 63, the applied gate-source voltage is negative. The negative gate-source voltage to be applied may be determined by the voltage across the switch 62, 63, as discussed below with respect to FIG. 6.

Figure 5:
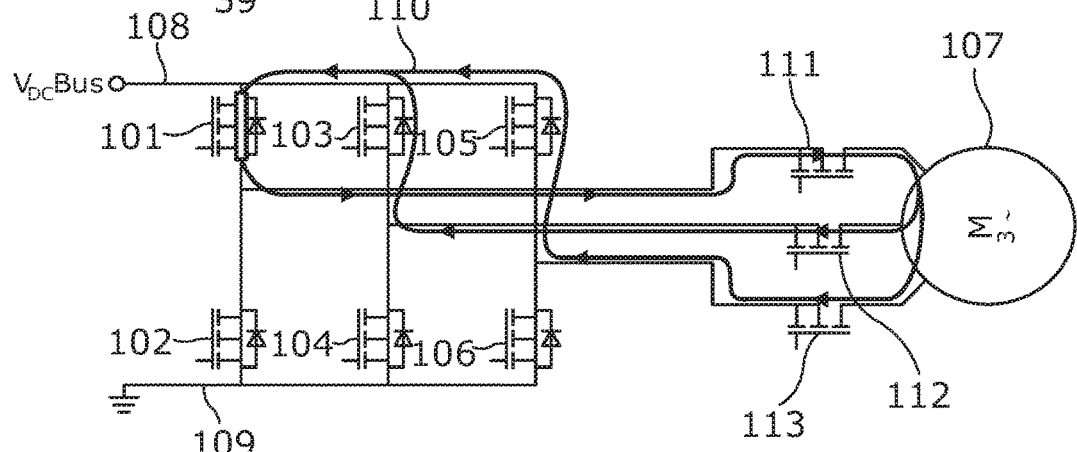
FIG. 5 shows a circuit diagram for a motor apparatus for an electric power assisted steering system in accordance with a second embodiment of the invention.

FIG. 5 of the accompanying drawings shows a second embodiment of the invention, which is equivalent in function to that of FIG. 3 of the accompanying drawings. Features equivalent to that of the circuit of FIG. 4 have been shown with corresponding reference numerals, raised by 50.

In this embodiment, there are three phase isolation switches 111, 112, 113 all employing GaN transistors. As these devices can block current in either direction, the number of phase isolation semiconductor switches in order to allow control of the non-failed phases (as in FIG. 3 above) reduces from 6 to 3. Both embodiments therefore have the benefit of having lower power component count, cost and lower inserted losses.

Figure 6:
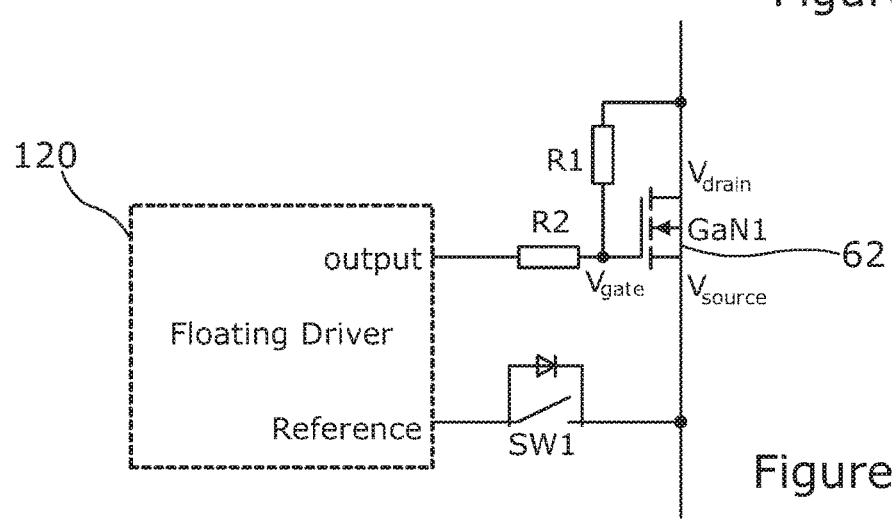
FIG. 6 shows a driver circuit for use with the circuits of FIG. 4 or 5.

A GaN phase isolation driver circuit 120 to achieve the behaviour above is shown in FIG. 6; this can be used to control the GaN transistors of the circuits of either FIG. 4 or FIG. 5. For the sake of description only, we describe its use in controlling switch 62 of FIG. 4, but the principle of operation would be the same for any of the phase isolation switches 62, 63, 111, 112, 113 described above.

In normal operation switch SW1 is closed and the driver circuit 120 applies a voltage between the gate and source of the GaN switch 62 ($V_{gs}$) appropriate to fully turn on the GaN switch 62. R1 resistance is relatively large in comparison to R2 and therefore it does not significantly affect the gate voltage. With the GaN switches 62, 63; 111, 112, 113 closed in each phase current can be freely controlled in the motor 57, 107 with the three phase inverter 51, 52, 53, 54, 55, 56; 101, 102, 103, 104, 105, 106.

In case of a short circuit failure of one of the inverter MOSFETS 51, 52, 53, 54, 55, 56; 101, 102, 103, 104, 105, 106 when it is desired to turn off the GaN switch 62, the voltage output by the driver circuit 120 can be controlled to 0V and SW1 opened. Looking at the voltage across the GaN switch 62 (that is, the voltage between the drain and the source $V_{ds}$), for positive $V_{ds}$ conditions, $V_{gs}$ is held close to 0V by R2 in series with the diode across SW1. For negative $V_{ds}$ conditions, with the diode across SW1 being reverse biased, the gate voltage is determined by R1 and the drain voltage.

The invention claimed is:

1. A control circuit for a multi-phase motor, the control circuit comprising:
   a plurality of inverter bridges, each inverter bridge being arranged to provide an output voltage for a phase of the motor;
   a plurality of outputs, each output being arranged to be coupled to one phase of the motor to provide the output voltage to that phase of the motor;
   at least one isolation switch, each isolation switch being coupled between one of the inverter bridges and one of the outputs, so as to selectively isolate the output from the inverter bridge, in which the at least one isolation switch is a Gallium Nitride (GaN) transistor comprising a gate, a drain, and a source;
   a controller comprising a first output, and a second output coupled to the gate of the GaN transistor;
   a switch and a diode connected in parallel between the first output and the source of the GaN transistor; and
   wherein during a normal mode of operation of the controller, the switch is closed and the diode is forwarded biased and the controller applies a positive voltage between the gate and the source of the GaN transistor so that the GaN transistor does not isolate its output from its inverter bridge when the switch is closed, and
   wherein during a phase isolation mode of operation of the controller, the switch is opened and the diode is reverse biased and the controller applies one of a zero or a negative voltage between the gate and the source of the GaN transistor so that the GaN transistor isolates its output from the inverter bridge when the switch is opened.

2. The control circuit of claim 1, in which each GaN transistor provides the selective isolation of each isolation switch.

3. The control circuit of claim 1, in which each inverter bridge which is not coupled to an isolation switch is coupled to an output.

4. The control circuit of claim 1, in which the controller is arranged such that the negative voltage applied between the gate and the source of each GaN transistor may be dependent upon a voltage across the GaN transistor.

5. The control circuit of claim 1, wherein the controller applies the zero voltage between the gate and the source of the GaN transistor when the GaN transistor has a positive drain to source voltage.

6. The control circuit of claim 1, wherein the controller applies the negative voltage between the gate and the source of the GaN transistor when the GaN transistor has a negative drain to source voltage.

7. A motor apparatus comprising a motor having a plurality of phases and a control circuit, wherein the control circuit comprises:
   a plurality of inverter bridges, each inverter bridge being arranged to provide an output voltage for a phase of the motor;
   a plurality of outputs, each output being arranged to be coupled to one phase of the motor to provide the output voltage to that phase of the motor;
   at least one isolation switch, each isolation switch being coupled between one of the inverter bridges and one of the outputs, so as to selectively isolate the output from the inverter bridge, in which the at least one isolation switch is a Gallium Nitride (GaN) transistor comprising a gate, a drain, and a source, and wherein each phase is coupled to one of the outputs of the control circuit;
   a controller comprising a first output, and a second output coupled to the gate of the GaN transistor;
   a switch and a diode connected in parallel between the first output and the source of the GaN transistor; and
   wherein during a normal mode of operation of the controller, the switch is closed and the diode is forwarded biased and the controller applies a positive voltage between the gate and the source of the GaN transistor so that the GaN transistor does not isolate its output from its inverter bridge when the switch is closed, and
   wherein during a phase isolation mode of operation of the controller, the switch is opened and the diode is reverse biased and the controller applies one of a zero or a negative voltage between the gate and the source of the GaN transistor so that the GaN transistor isolates its output from the inverter bridge when the switch is opened.

8. The motor apparatus of claim 7, in which each GaN transistor provides the selective isolation of each isolation switch.

9. The motor apparatus of claim 7, in which each inverter bridge which is not coupled to an isolation switch is coupled to an output.

10. A method of controlling a control circuit for a multi-phase motor, the control circuit comprising:
- a plurality of inverter bridges, each inverter bridge being arranged to provide an output voltage for a phase of the motor;
- a plurality of outputs, each output being arranged to be coupled to one phase of the motor to provide the output voltage to that phase of the motor;
- at least one isolation switch, each isolation switch being coupled between one of the inverter bridges and one of the outputs, so as to selectively isolate the output from the inverter bridge, in which the each isolation switch comprises a Gallium Nitride (GaN) transistor comprising a gate, a drain, and a source;
- a controller comprising a first output, and a second output coupled to the gate of the GaN transistor;
- a switch and a diode connected in parallel between the first output and the source of the GaN transistor; and the method comprising, in a normal mode of operation of the controller:
- closing the switch to forward bias the diode; and
- applying a positive voltage between the gate and the source of the GaN transistor so that the GaN transistor does not isolate its output from its inverter bridge when the switch is closed; and the method further comprising, in a phase isolation mode of operation of the controller:
- opening the switch to reverse bias the diode; and
- one of applying a zero or a negative voltage between the gate and the source of the GaN transistor so that the GaN transistor isolates its output from the inverter bridge when the switch is open.

11. The method of claim 10, in which the negative voltage applied between the gate and the source of each GaN transistor is dependent upon a voltage across the GaN transistor.

* * * * *